(12) United States Patent
Oshikawa

(10) Patent No.: US 8,052,959 B2
(45) Date of Patent: Nov. 8, 2011

(54) HYDROGEN SUPPLY DEVICE AND METHOD OF SUPPLYING HYDROGEN

(75) Inventor: Katsuhiko Oshikawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 564 days.

(21) Appl. No.: 12/303,941

(22) PCT Filed: Jun. 8, 2007

(86) PCT No.: PCT/JP2007/061651
§ 371 (c)(1),
(2), (4) Date: Dec. 8, 2008

(87) PCT Pub. No.: WO2007/142335
PCT Pub. Date: Dec. 13, 2007

(65) Prior Publication Data
US 2010/0163802 A1 Jul. 1, 2010

(30) Foreign Application Priority Data
Jun. 9, 2006 (JP) ................................ 2006-160978

(51) Int. Cl.
*B01J 7/00* (2006.01)
*C01B 3/04* (2006.01)
*C65B 3/00* (2006.01)

(52) U.S. Cl. ........ 423/648.1; 48/61; 206/0.6; 423/658.2

(58) Field of Classification Search ............... 423/648.1, 423/658.2; 48/61; 206/0.6
See application file for complete search history.

(56) References Cited

U.S. PATENT DOCUMENTS

| 4,913,879 A | * | 4/1990 | Honda et al. .................. 420/434 |
| 2004/0049983 A1 | | 3/2004 | Abe et al. |
| 2005/0079129 A1 | * | 4/2005 | Venkatesan et al. ........ 423/658.2 |
| 2008/0169207 A1 | * | 7/2008 | Kaye .................................. 206/6 |
| 2011/0121237 A1 | * | 5/2011 | Flynn et al. .................... 252/372 |

FOREIGN PATENT DOCUMENTS

| JP | 06-066646 A | 3/1994 |
| JP | 8-60167 A | 3/1996 |
| JP | 2002-029701 A | 1/2002 |
| JP | 2002-139387 A | 5/2002 |
| JP | 2003-155488 A | 5/2003 |
| JP | 2004-111167 A | 4/2004 |
| JP | 2004-229357 A | 8/2004 |

OTHER PUBLICATIONS

Douglas B. Rapp & James E. Shelby.: *Photo-induced hydrogen outgassing of glass*, Journal of Non Crystalline Solids 349 (2004) pp. 254-259.

* cited by examiner

*Primary Examiner* — Wayne Langel
(74) *Attorney, Agent, or Firm* — Kenyon & Kenyon LLP

(57) ABSTRACT

A hydrogen supply device and a method of supplying hydrogen are provided in which a hydrogen gas odorized with the odor agent is supplied by applying heat to a granular mixture of hydrogen storage glass beads and odor agent encapsulating capsules using irradiation with infrared light emitted from a light source.

14 Claims, 2 Drawing Sheets

HYDROGEN SUPPLY DEVICE AND METHOD OF SUPPLYING HYDROGEN

This is a 371 national phase application of PCT/JP2007/061651 filed 8 Jun. 2007, claiming priority to Japanese Patent Application No. 2006-160978 filed 9 Jun. 2006, the contents of which are incorporated herein by reference.

TECHNICAL FIELD

The present invention relates to a hydrogen supply device applicable to supplying hydrogen to which an odor has been added, and to a method of supplying hydrogen.

BACKGROUND ART

Conventionally hydrogen gas is widely stored, for example, by compressing hydrogen gas and filling in a flask, or by storing in a hydrogen absorbing alloy or hydrogen absorbing material capable of storing hydrogen.

As well as the above hydrogen absorbing alloys and the like, hydrogen storage glass capable of storing hydrogen is also known as a hydrogen storage material. Specifically, disclosure has been made of storing hydrogen in fine hollow glass spheres, and releasing the stored hydrogen by applying heat and light thereto (see, for example, "Photo-Induced Hydrogen outgassing of glass", Douglas B. Rapp and James E. Shelby, Journal of Non Crystalline Solids 349 (2004), pages 254 to 259).

However, since hydrogen is a colorless and odorless gas, it is generally very difficult to detect hydrogen leakage. Accordingly, in order to detect hydrogen leaks, a component for odorizing hydrogen (referred to below as an odor agent) is mixed with the hydrogen.

Generally, when the odor agent is mixed in, odor is added to the hydrogen by mixing the odor agent directly into the gaseous hydrogen. However, when the stored hydrogen is released, the strength of the smell needs to be controlled according to the amount of hydrogen released. Conventionally, either the strength of the smell is not controlled, or, in order to adjust the strength of smell, a new component such as a control valve for controlling the concentration was used when the odor agent is mixed in.

Even when using the above described hydrogen storage glass, the hydrogen diffuses out since the hydrogen storage glass contains small pores. However, large molecules like those of the odor agent are not able to permeate through these pores. In terms of results, the hydrogen storage glass does not control the strength of smell, or it is needed to provide a new separate component for control.

Hydrogen absorbing alloys are capable of absorbing hydrogen, but are not capable of absorbing the odor agent together with hydrogen by absorbing the odor agent.

DISCLOSURE OF INVENTION

Problems to be Solved by the Invention

However, when using a configuration with hydrogen storage glass, unless the pores between molecules in the surface of glass are sufficiently small, not only does the stored hydrogen leak out, but it is also not certain that the odor agent will penetrate by only increasing the pore size while suppressing the leakage of hydrogen.

Consequently, in order to mix an odor agent with hydrogen that is released, a mechanism is required to effectively mix the odor agent to odorize the hydrogen according to the amount of hydrogen released from the fine glass spheres or hydrogen absorbing alloy.

Provision of a mechanism such as an odor agent adding means in addition to the hydrogen storage leads to an increase in the number of components in the configuration.

The present invention is made in consideration of the above circumstances, and a hydrogen supply device and a method of supplying hydrogen, which are capable of supplying hydrogen to which an odor has been added according to the amount of hydrogen supplied, are needed.

Method of Solving the Problems

The first aspect of the invention is a hydrogen supply device configured with a hydrogen storage glass body that stores hydrogen and that releases the hydrogen when heat is applied, an odor agent encapsulating capsule that encapsulates an odor agent and that releases the odor agent when the heat is applied, and a heat source that applies heat to at least a portion of the hydrogen storage glass body and to at least a portion of the odor agent encapsulating capsule.

In the hydrogen supply device of the first aspect of the invention, by using hydrogen storage glass body that comprise a hydrogen storage material and a heat sensitive capsule, encapsulating an odor agent with molecules that are too large to be incorporated in the hydrogen storage glass body, the odor agent is released from the odor agent encapsulating capsules along with the release of hydrogen gas, according to application or otherwise of the desired amount of heat. Therefore, when heat is applied to supply hydrogen, hydrogen can be odorized according to the amount of hydrogen, without the additional provision of an odor adding device, while still storing the odor agent with the hydrogen in a normal temperature environment. In the first aspect of the invention, smell detection of hydrogen leakage is also possible.

Since the blending proportion of the hydrogen storage glass body and the odor agent encapsulating capsule is selectable, the odor concentration of the hydrogen is readily controllable according to the amount of hydrogen supplied and the desired strength of smell when supplying the hydrogen.

Also, by using hydrogen storage glass body as the hydrogen storage material, there is no requirement for a high pressure hydrogen tank or the like and a reduction in weight is possible, raising the degrees of freedom for design such as the shapes selectable. Also, since heat application is carried out to match the external demand for hydrogen, hydrogen is readily supplied according to need and a hydrogen amount corresponding to the demand is readily assured.

In addition, since only hydrogen passes through the hydrogen storage glass body, and impurity gases such as CO or $CO_2$ do not. Therefore, the hydrogen storage glass body also has a filtering function, and provides the effect of increasing the purity of the hydrogen released, and subsequently, for example, preventing the deterioration of a catalyst used in a hydrogen utilizing device such as a fuel cell to which the hydrogen is supplied.

The first aspect of the invention may also be provided with a mixture storage container, in which a mixture from mixing together the hydrogen storage glass body and the odor agent encapsulating capsule is stored, and with a gas generation unit, into which the mixture is supplied from the mixture storage container, and that generates, from the supplied mixture, hydrogen gas odorized by the odor agent, by applying heat from the heat source.

Since the hydrogen storage glass body releases hydrogen when heated and the odor agent encapsulating capsule releases the odor when heated are in a state in which they are mixed together, the hydrogen storage glass body and the odor agent encapsulating capsule can be supplied to the gas generation unit in such a mixed state. Therefore, when heating, they both can be heated together and the hydrogen gas and the odor agent are released at the same time, namely, odor-applied hydrogen gas can be supplied.

The first aspect of the invention may also be configured with the hydrogen storage glass body and the odor agent encapsulating capsule prepared with different external diameters from each other. Furthermore, the invention may be provided with a separation and recovery unit for separating and recovering the mixture according to external diameter after application of heat and generation of the odor-applied hydrogen gas in which hydrogen and the odor are mixed.

By carrying out recovery, not only is re-use after recovery possible, but since separation and recover is possible, there is no necessity to provide a generation process of hydrogen (for example, line for generating hydrogen) and a generation process of an odor agent (for example, line for generating an odor agent), and odor-applied hydrogen gas can be readily generated and supplied using a single process with a single heat source.

The odor agent encapsulating capsule may be formed using a thermoplastic resin (for example, a paraffin resin component). By using a thermoplastic resin, the encapsulated odor agent can be released by melting or similar process when heating.

The hydrogen storage glass body preferably includes a borosilicate glass and iron oxide ($Fe_3O_4$) in an amount of 0.1% to 5% by weight. Glass, for example, with borosilicate glass as the principal component and containing $Fe_3O_4$ in an amount of 0.1% to 5% by weight is suitable for hydrogen storage.

The second aspect of the invention is a hydrogen supply device configured with a hydrogen absorbing alloy that stores hydrogen and that releases the hydrogen when heat is applied, an odor agent encapsulating capsule that encapsulates an odor agent and that releases the odor agent when heat is applied, and a heat source that applies heat to at least a portion of the hydrogen absorbing alloy and to at least a portion of the odor agent encapsulating capsule.

In a similar manner to the first aspect of the invention above, in the second aspect of the invention, by using a hydrogen absorbing alloy that is a hydrogen storage material and a heat sensitive capsule that encapsulates an odor agent with molecules that are too large to be incorporated in the hydrogen absorbing alloy, the odor agent is released from the odor agent encapsulating capsule, in which encapsulates the odor agent, along with the release of hydrogen gas, according to application or otherwise of the desired amount of heat. Therefore, when heat is applied to supply the hydrogen, the hydrogen can be odorized by the odor agent added according to the amount of hydrogen and be supplied, without the additional provision of an odor adding device, while still storing the odor agent with the hydrogen in a normal temperature environment. Furthermore, in the second aspect of the invention, smell detection of hydrogen leakage is also possible.

Since the blending proportion of the hydrogen absorbing alloy and the odor agent encapsulating capsule is selectable, the odor concentration of the hydrogen is readily controllable according to the amount of hydrogen supplied and the desired strength of the smell when supplying the hydrogen.

A light source for emitting infrared light may be used as the heat source in the first and second aspects of the invention above, and configuration may be made with the heat applied by irradiating with infrared light. Infrared light is beneficial from the standpoint of suppressing deterioration of the odor agent and of resin components in other systems (visible light and UV light promote deterioration thereof).

A third aspect of the invention is a method of supplying hydrogen including applying heat to hydrogen storage glass body storing hydrogen and an odor agent encapsulating capsule in which an odor agent is encapsulated, odorizing the hydrogen released from the hydrogen storage glass body with the odor agent released from the odor agent encapsulating capsule, and supplying the odorized hydrogen. A fourth aspect of the invention is a method of supplying hydrogen including applying heat to hydrogen absorbing alloy storing hydrogen and an odor agent encapsulating capsule in which the odor agent is encapsulated, odorizing the hydrogen released from the hydrogen storage glass body with the odor agent released from the odor agent encapsulating capsule, and supplying the odorized hydrogen.

In the third and the fourth aspects of the invention, by using hydrogen storage glass body, or by using a hydrogen absorbing alloy, which are hydrogen storage materials, and also heat sensitive capsule that encapsulate an odor agent with molecules that are too large to be incorporated in the hydrogen storage glass body or in the hydrogen absorbing alloy, the odor agent is released from the odor agent encapsulating capsule that encapsulate the odor agent along with the release of hydrogen gas, according to application or otherwise of the desired amount of heat. Therefore, when heat is applied to supply hydrogen, the hydrogen can be odorized with the odor agent added according to the amount of hydrogen and can be supplied, without the additional provision of an odor adding device, while still storing the odor agent with the hydrogen in a normal temperature environment. Further, in the third and fourth aspects of the invention, smell detection of hydrogen leakage is also possible.

Since the blending proportion of the hydrogen storage glass body or the hydrogen absorbing alloy, and the odor agent encapsulating capsule is selectable, hydrogen gas is supplied with the odor concentration of the hydrogen is readily controllable according to the amount of hydrogen supplied and the desired strength of the smell when supplying the hydrogen.

EFFECTS OF THE INVENTION

A hydrogen supply device and a method of supplying hydrogen, in which capable of supplying hydrogen odorized according to the amount of hydrogen supplied, are provided.

BEST MODE OF CARRYING OUT THE INVENTION

Hereinbelow, explanation will be given of exemplary embodiments of the hydrogen supply device of the present invention, with reference to the drawings, and through explanation of the details, the method of supplying hydrogen of the invention will also be described. However, the present invention is not limited to each of the following exemplary embodiments.

The term "hydrogen storage" in the present invention includes methods and modes for chemically or physically keeping hydrogen within glass, such as absorbing or absorbing hydrogen, as well as encapsulation of hydrogen gas.

First Exemplary Embodiment

Explanation will be given of a first exemplary embodiment of the hydrogen supply device of the present invention with reference to FIG. 1. The hydrogen supply device of the present invention is, for example, configured with a mixture of small hydrogen storage glass spheres having a bead shape serving as a hydrogen storage glass body, and odor agent encapsulating capsules within which the odor agent is encapsulated, and supplying odor-applied hydrogen gas to the outside by applying heat to the mixture thereof in the mixed state.

In the present exemplary embodiment, explanation of the use of later described hydrogen storage glass beads as the hydrogen storage glass body and the use of paraffin wax capsules within which an odor agent has been encapsulated as the odor agent encapsulating capsules will be described. However, the present invention is not limed to the exemplary embodiment below.

Figure 1:
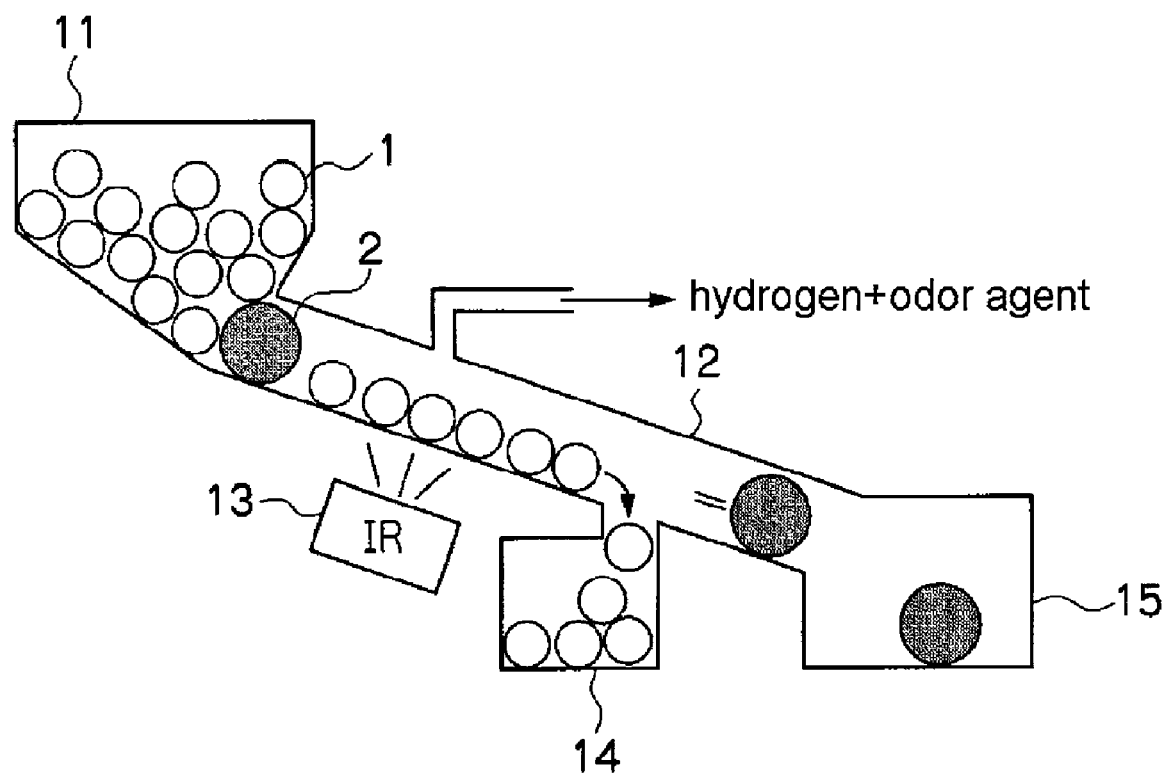
FIG. 1 is a schematic sectional view illustrating a cross-sectional configuration of a hydrogen supply device in a first exemplary embodiment of the present invention.

As shown in FIG. 1, the hydrogen supply device of the present exemplary embodiment is provided with: a granule storage container 11 for storing mixed granular bodies of hydrogen storage glass beads 1 mixed with odor agent encapsulating capsules 2; a gas generation chamber 12 which serves as a gas generation portion and a hydrogen gas outlet is provided, for generating an odor-applied hydrogen gas from the mixed granular bodies supplied from the granule storage container 11; an infrared light source 13 for heating the mixed granular bodies through the gas generation chamber; a bead recovery tank 14 for selectively recovering the hydrogen storage glass beads 1 in the mixed granular bodies; and a capsule recovery tank 15 for selectively recovering the odor agent encapsulating capsules in the mixed granular bodies.

The granule storage container 11 has a wide opening granule body inlet at the top portion of the container so that the granular body can be introduced therein, and the granule storage container 11 is configured in a funnel shaped structure so that the width of the opening gradually decreases toward the bottom of the container from the granular body inlet, with a granular body outlet formed at the bottom of the container, the outlet having a cross-section diameter through which granular body having the largest external diameter is capable to pass through. The mixed granular bodies introduced into granule storage container from the granular body inlet are temporarily stored within the container, and the hydrogen storage glass beads 1 and the odor agent encapsulating capsules 2 in the stored mixed granular bodies pass out in a random sequence through the granular body outlet at the bottom of the container according to the external requirements for hydrogen supply.

The hydrogen storage glass beads 1 are glass beads of external diameter from 0.1 μm to 1000 μm, and these are manufactured in a spherical shape by taking a mixture of glass frit, of product number 7059 manufactured by Corning, and iron oxide ($Fe_3O_4$) of 2% by weight to the total weight, heating and melting the mixture and then cooling rapidly from the molten state in a hydrogen atmosphere. Glass beads made in this manner are doped with iron oxide and contain pores within the glass within which hydrogen can be stored.

In addition to the hydrogen storage glass beads used in the present exemplary embodiment, appropriate selection may be made from the glass bodies obtained by, for example: using a commercially available borosilicate glass frit (such as, for example, product numbers 0211, 7070, 7251, 7740, 7720, 7760, 9741 manufactured by Corning), or aluminoborosilicate glass frit (such as, for example, product number 7059 manufactured by Corning); adding iron oxide ($Fe_3O_4$) in an amount of from 0.1% to 10% by weight (preferably from 1% to 5% by weight) as a dopant thereto; melting the resultant mixture of glass frit and iron oxide at the respective vitrification temperature by heating; then subjecting molten mixture to rapid cooling from the molten state (500° C. to 700° C.) in a hydrogen atmosphere.

Reference may be made to pages 254 to 259 of "Photo-Induced Hydrogen outgassing of glass", by Douglas B. Rapp and James E. Shelby in the Journal of Non Crystalline Solids 349 (2004) for details regarding types, manufacturing methods and the like of hydrogen storage glass beads (hydrogen storage glass body).

When heat is applied to hydrogen storage glass body, such as hydrogen storage glass beads, as later described by irradiation with infrared light or the like, the hydrogen becomes more able to permeate, and hydrogen is released from the medium.

The external diameter of the hydrogen storage glass beads may not be especially limited and be appropriately selected, but the external diameter from 10 μm to 100 μm is preferable from the standpoint of hydrogen storage capacity.

The odor agent encapsulating capsules 2 are spherical capsules using paraffin wax of particle diameter (external diameter) of from 0.1 mm to 50 mm, and are configured such that the capsules melt when heated to 60° C. or above and the encapsulated odor agent is released to outside of the capsules.

The odor agent encapsulating capsules 2 may be manufactured by forming a raw material of straight chain palmitic acid (with n=14 methylene groups) into hollow spheres using a mold or similar device, introducing an odor agent into the formed spheres through pores opened in the surface of the spheres, and sealing the pores by heating and melting.

In addition to the palmitic acid, other materials that may be used in the manufacture of the odor agent encapsulating capsules include straight chain alkyl-based hydrocarbon compounds that are solid at room temperature, and thermoplastic resins such as polypropylene, polystyrene, and engineering plastics.

The straight chain alkyl-based hydrocarbon compound includes, for example, $CH_3(CH_2)_n COOH$ (n=12 to 22). The value of n can be appropriately selected in consideration of the temperature of the usage environment of the hydrogen supply device.

Specifically, for example, when the temperature of the usage environment is 40° C. or lower, the alkyl-based hydrocarbon compounds having a glass transition temperature of 30° C. to 50° C. such as a myristic acid of n=12, a palmitic acid of n=14, or the like are preferable, and when the temperature of the usage environment exceeds 40° C. and approaches 50° C., the alkyl-based hydrocarbon compounds having a glass transition temperature of 40° C. to 70° C. such as a stearic acid of n=16, an araquidic acid of n=18, or the like are preferable.

When thermoplastic resins other than palmitic acids are used, they can be formed into capsules in a similar manner to the method of forming palmitic acids into capsules described above.

Examples of the odor agent encapsulated into the capsules include, for example, single components or blends of components selected from 1-pentene, 2-methyl-1-butene, an allene, an ethylallene, 1,4-pentadiene, 1-butyne, styrene, vinylacetylene, octene, decene, propylene, isobutene, diisobutylene, isoprene, cyclopentene, cyclopentadiene, 1,3- cyclohexadiene, 1-vinylcyclohexene-1,5-ethylidene-2-norbornene, a cyclohexene, 1-methylpyrrole, pyrazine, 2,3-dimethylpyrazine, 2-propyl pyrazine, 2-picoline, α-p-dimethylstyrene, a cumene, limonene, mesitylene, 2-methylnaphthalene, 3-methylindole, a myrcene, α-pinene, 1-octanol, 2-alkoxy-3-alkylpyrazine, 2-methoxy-3-ethylpyrazine, 2-methoxy-3-n-propylpyrazine, 2-methoxy-3-iso-propylpyrazine, 2-methoxy-3-n-propylpyrazine, 2-methoxy-3-n-butylpyrazine, 2-methoxy-3-iso-butylpyrazine, 2-ethoxy-3-methylpyrazine, 2-ethoxy-3-ethylpyrazine, 2-ethoxy-3-n-propylpyrazine, 2-ethoxy-3-iso-propylpyrazine, 2-ethoxy-3-n-butyl-pyrazine, 2-ethoxy-3-iso-butylpyrazine, and 2,3-butanediol, in which described in JP-A No. 2003-155488 and JP-A No. 8-60167.

The particle size (external diameter) of the odor agent encapsulating capsules may not be especially limited and be appropriately selected, however the particle size is preferable from 1 mm to 50 mm from the standpoint of separation from the hydrogen storage glass beads.

In the present exemplary embodiment, the mixed granular bodies of hydrogen storage glass beads 1 and odor agent encapsulating capsules 2 are blended so as to form a ratio of 10000 hydrogen storage glass beads to each odor agent encapsulating capsule.

The blending ratio of the hydrogen storage glass beads and the odor agent encapsulating capsules can be appropriately selected in consideration of the relationship between the amount of hydrogen released and the strength of smell.

The gas generation chamber 12 is a chamber with a hollow internal section having a height that the odor agent encapsulating capsules 2 can pass therethrough and width that is larger than the height. And a granular body inlet provided at one end of the gas generation chamber 12 is connected to the granular body outlet of the granule storage container 11.

The gas generation chamber 12 is angled, as shown in FIG. 1, so that the height of the bottom of the chamber gets lower from the end at the side connected to the granular body outlet toward the other end thereof, and the mixed granular bodies supplied in from the granular body inlet roll on the bottom of the chamber and are applied heat through the chamber wall while they roll along. The hydrogen storage glass beads 1 and the odor agent encapsulating capsules 2 that heated in the chamber respectively give off hydrogen or odor agent, and hydrogen to which the odor has been added is generated.

A hydrogen outlet for discharging the generated hydrogen is provided to the top wall, which is positioned to the side against the direction of gravity and opposite to the bottom wall along which the mixed granular bodies roll, of the gas generation chamber 12, hydrogen can be supplied from the hydrogen outlet to a not illustrated hydrogen using device such as a fuel cell or the like.

The infrared light source 13 is disposed so as to be able to apply heat from the chamber outside to the mixed granular bodies rolling along the bottom wall of the gas generation chamber 12. The bottom wall is heated by irradiation of infrared light to the outside surface of the bottom wall, and mixed granular bodies in the gas generation chamber are heated through the bottom wall to the temperature at which hydrogen is released and the melting temperature of the capsules (for example 50° C. to 60° C.), and gaseous hydrogen and odor are released.

The heating may be carried out such that the hydrogen storage glass beads 1 and the odor agent encapsulating capsules 2 are directly heated from the bottom wall, or such that the atmosphere within the gas generation chamber is raised in temperature.

Also, with regard to the heat source, another type of electromagnetic radiation other than infrared light may be irradiated, or the heat source may be configured with a heat source used generally such as, for example, a heater.

The bead recovery tank 14 is attached to the other end of the sloping bottom wall of the gas generation chamber 12, and only the hydrogen storage glass beads 1, with small external diameter, selectively fall therein and are separated from the mixed granular bodies after rolling along the bottom wall and being heated, so as to be recovered. When this occurs, the odor agent encapsulating capsules 2 with larger external diameter than the hydrogen storage glass beads 1 continue to roll further along the gas generation chamber.

The recovered hydrogen storage glass beads 1 are reusable by storing hydrogen therein and regenerating.

The capsule recovery tank 15 is attached to the other end of the gas generation chamber 12, and the odor agent encapsulating capsules 2 are recovered after the hydrogen storage glass beads 1 have been separated therefrom.

In the present exemplary embodiment, when the mixed granular bodies of the hydrogen storage glass beads 1 and the odor agent encapsulating capsules 2 stored in the granule storage container 11 are supplied into the gas generation chamber 12 heated by the infrared light source 13, hydrogen is released from the hydrogen storage glass beads 1 and also the odor agent is released from the odor agent encapsulating capsules 2 due to the capsules melting, then the odor-applied hydrogen gas is generated. The generated hydrogen gas is discharged from the hydrogen outlet of the gas generation chamber 12, and supplied to an external hydrogen using device such as a fuel cell.

In the present exemplary embodiment, the mixed granular bodies have a mixing ratio by number of granules (glass beads/capsules), which blends the hydrogen storage glass beads 1 and the odor agent encapsulating capsules 2, is 10,000/1. However, the ratio by granules may be suitably selected within the above range in consideration of the hydrogen storage ability of the hydrogen storage glass bodies used, the desired strength of smell, the type of odor agent and the amount of odor agent encapsulated within the capsules.

In the present exemplary embodiment, the mixed granular bodies of hydrogen storage glass beads and the blending of the hydrogen storage glass beads 1 and the odor agent encapsulating capsules are stored in the granule storage container. However, the stored mixed granular bodies may be stored by introducing pre-blended mixed granular bodies into a granule storage container, or an input vessel for introducing hydrogen storage glass beads and an input vessel for introducing odor agent encapsulating capsules may be mounted to the granular body inlet of the granule storage container, and the stored mixed granular bodies may be stored by introducing the hydrogen storage glass beads and the odor agent encapsulating capsules at the same time or alternately from the both of the input vessels and producing during introduction thereof.

Although an example of the present exemplary embodiment has been explained, when the above described the odor agent and the thermoplastic resin are used, the odor agent encapsulating capsules may be produced by similar methods and used, and similar effects can be obtained therefrom. The odor agent encapsulating capsules may be used by itself or in a combination of two or more thereof, according to the purpose, situation, or the like.

Second Exemplary Embodiment

Explanation will be given of a second exemplary embodiment of the hydrogen supply device of the present invention, with reference to FIG. 2. The present exemplary embodiment is configured using small hydrogen storage glass spheres as the hydrogen storage glass bodies and also using a hydrogen absorbing alloy as the hydrogen storage material.

It should be noted that the hydrogen storage glass beads used in the first exemplary embodiment and other examples of hydrogen storage glass bodies can be used, and elements of the configuration similar to those of the first exemplary embodiment will be allocated the same reference numerals and detailed explanation thereof will be omitted.

Figure 2:
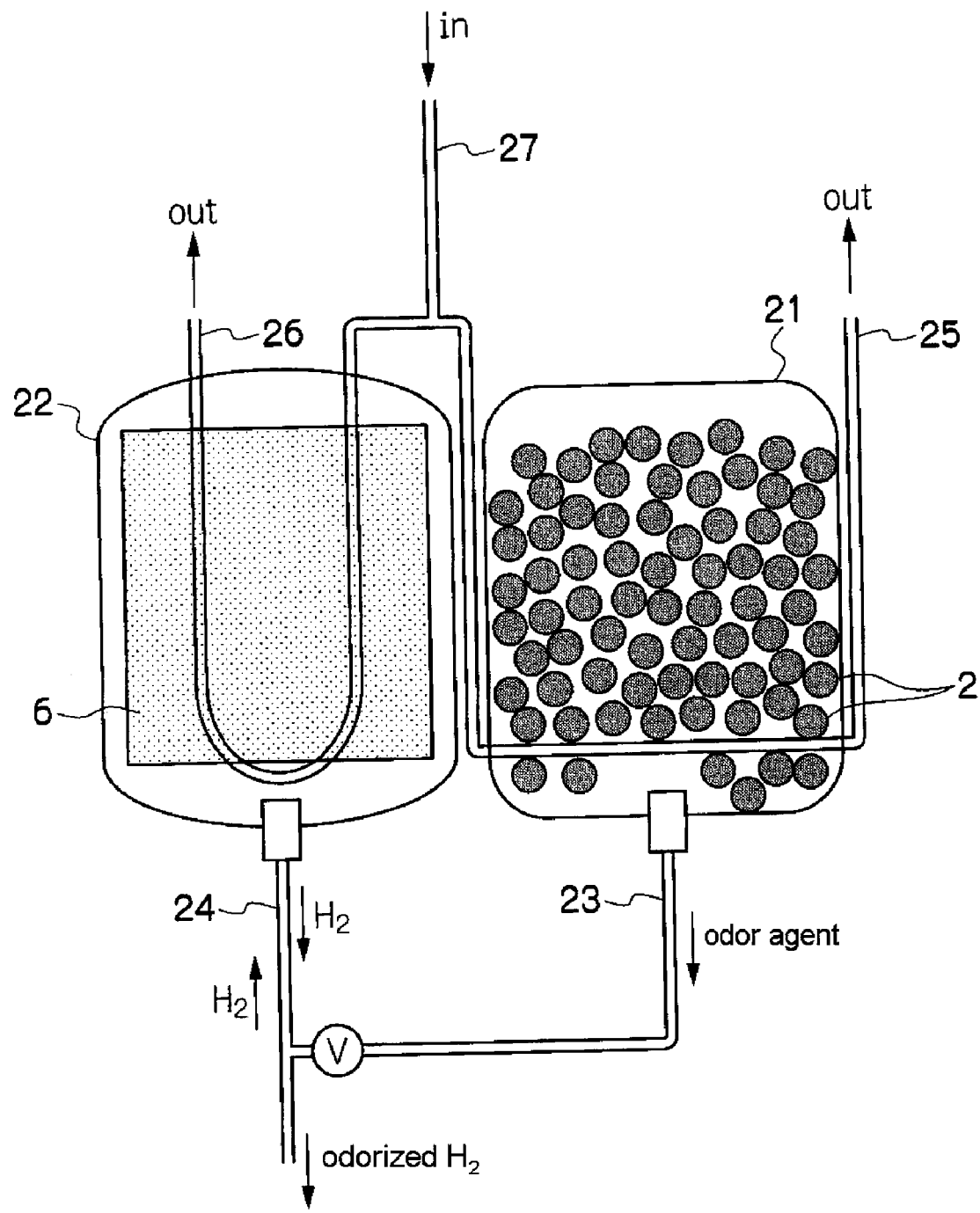
FIG. 2 is a schematic sectional view illustrating a cross-sectional configuration of a hydrogen supply device in a second exemplary embodiment of the present invention.

The hydrogen supply device of the present exemplary embodiment, as shown in FIG. 2, is provided with: a granule storage container 21 in which the odor agent encapsulating capsules 2 are stored; a hydrogen storage tank 22 having a circular shaped cross-section and within which a hydrogen absorbing alloy (MH) of $Ti_{25}Cr_{50}V_{25}$ alloy 6 is stored; and heat exchanging tube 25, 26, for respectively heating odor agent encapsulating capsules and the MH by exchanging heat with a heating medium passing therethrough.

The granule storage container 21 is a hollow container having a removable cap, not shown in the figures, and the odor agent encapsulating capsules 2 are stored within the container. An outlet tube 23 for discharging the odor agent generated by heating is connected to the outlet formed in the container. The odor agent encapsulating capsules 2 are introduced into the granule storage container and discharged from the container, when the cap is opened.

The hydrogen storage tank 22 is a high pressure hollow tank able to withstand a pressure of 35 MPa, which is formed in a cylindrical shape with a circular cross-section of 40 mm diameter using stainless steel with wall thickness of 10 mm, and have both ends in the cylinder length direction closed off. With regard to the wall thickness, cross-sectional shape, size etc., various other thicknesses than the above, various shapes such as a rectangular shape, elliptical shape or the like, and sizes may be selected according to the purpose.

A hydrogen supply/discharge tube 24 is attached to one end of the hydrogen storage tank 22 in the length direction, so that hydrogen is supplied into the tank from outside and stored, and the stored hydrogen is released outside according to requirements. One end of the outlet tube 23 is attached to the hydrogen supply/discharge tube 24. The odor agent released from the granule storage container 21 can be mixed in when hydrogen is being released, and odor-applied hydrogen gas can be supplied outside.

Examples of the MH include metal alloys of two metals, metal alloys of three metals, metal alloys of four metals and the like, and preferable examples thereof, in addition to the above TiCrV-based alloy, include TiCrMn-based alloys, LaNi-based alloys, TiFe-based alloys, and TiCrMoV-based alloys. Specific examples of the MH include $Ti_{25}Cr_{50}V_{25}$, $Ti_{25}Cr_{25}V_{50}$, $Ti_{36}Cr_{32}Mn_{32}$, $Ti_{25}Cr_{50}V_{15}Mo_{10}$, $Ti_{25}Cr_{50}V_{20}Mo_5$, and $LaNi_5$.

The form of the hydrogen absorbing alloy (MH) may be any shape or size, such as a powder, granules, pellets or the like.

The hydrogen absorbing alloy may be used one obtained by forming raw alloy by arc melting powdered metals at the desired composition ratio or the composition, and pulverizing the raw alloy using a pulverizer such as a ball mill (preferably, further annealing). The hydrogen storage tank of the present invention may be manufactured by filling (preferably at a high density) the MH, such as in the obtained powder state, into the tank.

The heat exchanging tube 25 is an aluminum tube passing through the side walls of the container and disposed within the container, such that heating can be carried out to the odor agent encapsulating capsules 2 stored within the container by exchanging heat with a heating medium flowing through the tube.

The heat exchanging tube 26 is a U-shaped aluminum tube, which passes through the wall of the tank at the opposite end of the hydrogen storage tank 22 to the end at which the hydrogen supply/discharge tube 24 is connected, such that heating can be carried out to the MH stored within the tank by exchanging heat with a heating medium flowing through the tube.

The end, which supplies heating medium, of each of the heat exchanging tube 25 and the heat exchanging tube 26 is connected to one end of a common tube 27 for supplying heating medium, such that the heating medium can be supplied to both the granule storage container 21 and the hydrogen storage tank 22 at the same time to heat both at the same time. The other end, which is side of discharging heating medium, of each of the heat exchanging tube, and the other end of the common tube 27 are connected to common tube, which is not illustrated, for circulating heating medium, configuring a heating medium circulation system.

In the present exemplary embodiment, when the heating medium is supplied to the heat exchanging tube 25, 26, hydrogen gas released from the $Ti_{25}Cr_{50}V_{25}$ alloy 6 is discharged from the hydrogen storage tank 22, the odor agent released from the odor agent encapsulating capsules 2 due to the capsules melting is also discharged from the granule storage container 21. And then, hydrogen gas to which an odor agent has been added by blending is generated. The generated hydrogen gas is supplied to an external hydrogen using device such as a fuel cell.

The entire disclosure of Japanese Patent Application 2006-160978 is incorporated herein into this specification by reference.

All documents, patent applications and technical standards recited in this specification are incorporated herein by reference in this specification to the same extent as if each individual publication, patent application or technical standard was specifically and individually indicated to be incorporated by reference.

The invention claimed is:

1. A hydrogen supply device comprising:
   a hydrogen storage glass body that stores hydrogen and that releases the hydrogen when heat is applied;
   an odor agent encapsulating capsule that encapsulates an odor agent and that releases the odor agent when heat is applied; and
   a heat source that applies heat to at least a portion of the hydrogen storage glass body and to at least a portion of the odor agent encapsulating capsule.

2. The hydrogen supply device according to claim 1, further comprising:
   a mixture storage container that stores a mixture obtained by mixing together the hydrogen storage glass body and the odor agent encapsulating capsule; and
   a gas generation unit, into which the mixture is supplied from the mixture storage container, and that generates, from the supplied mixture, hydrogen gas odorized by the odor agent, by applying heat from the heat source.

3. The hydrogen supply device according to claim 1, wherein the hydrogen storage glass body and the odor agent encapsulating capsule respectively have different external diameters, and the device further comprises a separation and recovery unit that separates the mixture according to the external diameter and recovers the mixture, after generation of the odor-applied hydrogen gas.

4. The hydrogen supply device according to claim 1, wherein the odor agent encapsulating capsule is formed using a thermoplastic resin.

5. The hydrogen supply device according to claim 1, wherein the hydrogen storage glass body includes a borosilicate glass and iron oxide ($Fe_3O_4$) in an amount of from 0.1% to 5% by weight.

6. The hydrogen supply device according to claim 3, wherein the external diameter of the hydrogen storage glass body is from 10 μm to 100 μm.

7. The hydrogen supply device according to claim 6, wherein the external diameter of the odor agent encapsulating capsules is from 1 mm to 50 mm.

8. A method of supplying hydrogen comprising:
applying heat to a hydrogen storage glass body storing hydrogen and an odor agent encapsulating capsule in which an odor agent is encapsulated;
odorizing hydrogen released from the hydrogen storage glass body with odor agent released from the odor agent encapsulating capsule; and
supplying the odorized hydrogen.

9. The method of supplying hydrogen according to claim 8, wherein the odor agent encapsulating capsule is formed using a thermoplastic resin.

10. The method of supplying hydrogen according to claim 8, wherein the hydrogen storage glass body includes a borosilicate glass and iron oxide ($Fe_3O_4$) in an amount of from 0.1% to 5% by weight.

11. A hydrogen supply device comprising:
a hydrogen absorbing alloy that stores hydrogen and that releases the hydrogen when heat is applied;
an odor agent encapsulating capsule that encapsulates an odor agent and that releases the odor agent when heat is applied; and
a heat source that applies heat to at least a portion of the hydrogen absorbing alloy and to at least a portion of the odor agent encapsulating capsule.

12. The hydrogen supply device according to claim 1, wherein the heat source is a light source for emitting infrared light, and the heat is applied by irradiation with infrared light.

13. The hydrogen supply device according to claim 11, wherein the heat source is a light source for emitting infrared light, and the heat is applied by irradiation with infrared light.

14. A method of supplying hydrogen comprising:
applying heat to hydrogen absorbing alloy to which hydrogen is adsorbed and to an odor agent encapsulating capsule in which an odor agent is encapsulated;
odorizing hydrogen released from the hydrogen absorbing alloy with odor agent released from the odor agent encapsulating capsule; and
supplying the odorized hydrogen.

* * * * *